(12) United States Patent
Kim et al.

(10) Patent No.: US 12,535,428 B2
(45) Date of Patent: Jan. 27, 2026

(54) APPARATUS FOR MONITORING FLUID

(71) Applicants: Electronics and Telecommunications Research Institute, Daejeon (KR); KOREA UNIVERSITY Research and Business Foundation, Seoul (KR)

(72) Inventors: Jin Tae Kim, Daejeon (KR); Myung-Ki Kim, Seoul (KR); Haerin Jeong, Seoul (KR)

(73) Assignees: Electronics and Telecommunications Research Institute, Daejeon (KR); Korea University Research and Business Foundation, Seoul (KR)

( * ) Notice: Subject to any disclaimer, the term of this patent is extended or adjusted under 35 U.S.C. 154(b) by 386 days.

(21) Appl. No.: 18/090,265

(22) Filed: Dec. 28, 2022

(65) Prior Publication Data
US 2023/0280278 A1 Sep. 7, 2023

(30) Foreign Application Priority Data
Mar. 3, 2022 (KR) .................. 10-2022-0027307

(51) Int. Cl.
*G01N 21/85* (2006.01)
*G01N 21/88* (2006.01)
*H01S 5/04* (2006.01)

(52) U.S. Cl.
CPC ......... *G01N 21/85* (2013.01); *G01N 21/8806* (2013.01); *G01N 2201/06113* (2013.01); *H01S 5/041* (2013.01)

(58) Field of Classification Search
CPC ........ G01N 21/85; G01N 21/00; G01N 21/84; G01N 21/39; G01N 21/41; G01N 21/636; G01J 5/00; H01S 5/041
See application file for complete search history.

(56) References Cited

U.S. PATENT DOCUMENTS

| 8,237,930 | B2 | 8/2012 | Hong et al. | |
| 10,247,676 | B1 * | 4/2019 | Shaw | G02B 6/02052 |

(Continued)

FOREIGN PATENT DOCUMENTS

| CN | 106932924 A | * | 7/2017 | ............. G02F 1/009 |
| CN | 113008841 A | * | 6/2021 | ............. G01N 21/63 |

(Continued)

OTHER PUBLICATIONS

Chen et al, Recent Progress on Optoplasmonic Whispering-Gallery-Mode Microcavities, Advanced Optical Materials, 2021 (Year: 2021).*

(Continued)

*Primary Examiner* — Uzma Alam
*Assistant Examiner* — Justin J Van Cleave
(74) *Attorney, Agent, or Firm* — NSIP Law

(57) ABSTRACT

Disclosed is a fluid monitoring apparatus. The fluid monitoring apparatus includes a chamber configured to store a fluid, a resonator in the chamber, a light source disposed on the chamber and configured to provide pump light to the resonator, a detector configured to detect laser light generated in the resonator, and a control unit connected to the detector and the light source and configured to identify a physical quantity in the fluid by detecting a resonance wavelength of the laser light using a detection signal of the laser light.

11 Claims, 7 Drawing Sheets

(56) References Cited

U.S. PATENT DOCUMENTS

| | | | |
|---|---|---|---|
| 11,119,228 B2* | 9/2021 | Kameshiro | ............. G01T 1/241 |
| 2010/0014545 A1 | 1/2010 | Lee et al. | |
| 2016/0221822 A1 | 8/2016 | Krumbein et al. | |
| 2018/0331504 A1 | 11/2018 | Kim et al. | |
| 2019/0293809 A1* | 9/2019 | Tosh | ........................ G01T 1/026 |
| 2022/0299416 A1* | 9/2022 | Sansa Perna | ...... G01N 15/0637 |

FOREIGN PATENT DOCUMENTS

| | | | | |
|---|---|---|---|---|
| KR | 10-0996450 B1 | 11/2010 | | |
| KR | 10-2014-0147622 A | 12/2014 | | |
| KR | 10-2016-0095645 A | 8/2016 | | |
| KR | 10-1896180 B1 | 9/2018 | | |
| KR | 10-2021-0021679 A | 3/2021 | | |
| KR | 20210021679 A | * | 3/2021 | ............... H01S 3/05 |
| KR | 10-2022-0001892 A | 1/2022 | | |

OTHER PUBLICATIONS

Lorente-Crespo et al, Edge-Plasmon Whispering-Gallery Modes in Nanoholes, Phys. Rev. Applied, 2020 (Year: 2020).*

Virk et al, A Thermal Plasmonic Sensor Platform: Resistive Heating of Nanohole Arrays, Nano Letters, 2014 (Year: 2014).*

Wondimu, S. F., et al. "Robust label-free biosensing using microdisk laser arrays with on-chip references." *Optics express* vol. 26. Issue 3 (2018). pp. 3161-3173.

Nasir, Abdul, et al. "Fully room temperature and label free biosensing based on an ink-jet printed polymer microdisk laser." *Optical Materials Express* vol. 11. Issue 3 (Mar. 2021). pp. 592-602.

Park, Byoung Jun, et al. "Nanolayer-embedded pseudo-photonic crystals." *Nanotechnology* vol. 30. Issue 47 (2019): 47LT01. pp. 1-7.

Lee, Jungmin, et al. "Printed nanolaser on silicon." *ACS Photonics* vol. 4. Issue 9 (2017). pp. 2117-2123.

Park, Byoung Jun, et al. "Analysis of a graphene-based silicon electro-absorption modulator in isotropic and anisotropic graphene models." *Journal of the Korean Physical Society* vol. 70. Issue 11 (2017). pp. 967-972.

Korean Office Action issued on Dec. 2, 2024, in counterpart Korean Patent Application No. 10-2022-0027307 (6 pages in English, 6 pages in Korean).

* cited by examiner

APPARATUS FOR MONITORING FLUID

CROSS-REFERENCE TO RELATED APPLICATIONS

This U.S. non-provisional patent application claims priority under 35 U.S.C. § 119 of Korean Patent Application No. 10-2022-0027307, filed on Mar. 3, 2022, the entire contents of which are hereby incorporated by reference.

BACKGROUND

The present disclosure herein relates to a fluid monitoring apparatus, and more particularly, to a fluid monitoring apparatus for monitoring a fluid using laser light.

In general, a resonator may generate laser light by means of a gain. Laser light may include a whispering gallery mode. The whispering gallery mode is a mode of electromagnetic waves formed along a surface of a resonator having a circular or elliptical curved surface such as a spherical or cylindrical shape. The whispering gallery mode has a particular shape caused by total internal reflection of a medium. The whispering gallery mode has a high quality factor due to low energy loss.

SUMMARY

The present disclosure provides a fluid monitoring apparatus for detecting a physical quantity of a fluid.

Disclosed is a fluid monitoring apparatus. The fluid monitoring apparatus includes a chamber configured to store a fluid, a resonator in the chamber, a light source disposed on the chamber and configured to provide pump light to the resonator, a detector configured to detect laser light generated in the resonator, and a control unit connected to the detector and the light source, and configured to identify impurities in the fluid by detecting a resonance wavelength of the laser light using a detection signal of the laser light. Here, the resonator may include: a support; and a disk plate provided on the support and having meta holes through which the fluid passes.

According to an example, the resonator may further include a temperature sensing layer in the meta holes.

According to an example, the temperature sensing layer may include a phase changing material.

According to an example, the resonator may further include a hydrogen sensing layer in the meta holes.

According to an example, the hydrogen sensing layer may include palladium.

According to an example, the resonator may further include a radiation sensing layer in the meta holes.

According to an example, the radiation sensing layer may include silicon carbide.

According to an example, the resonator may further include temperature sensing rings in the meta holes. The temperature sensing rings may include a phase changing material According to an example, the resonator may further include hydrogen sensing rings in the temperature sensing rings. The hydrogen sensing rings may include palladium.

According to an example, the resonator may further include radiation sensing rings at outer peripheries of the temperature sensing rings. The radiation sensing rings may include silicon carbide.

A fluid monitoring apparatus according to an example of the inventive concept includes: a chamber configured to store a fluid; a light source configured to provide pump light into the chamber; a resonator disposed in the chamber and configured to receive the pump light and generate laser light; a beam splitter provided between the light source and the chamber, and configured to transmit the pump light and reflect the laser light; and a detector provided adjacent to the beam splitter and configured to detect the laser light. Here, the resonator may include: a disk plate having meta holes; and a sensing layer provided in the meta holes.

According to an example, the disk plate may include a group III-V semiconductor material.

According to an example, the sensing layer may include a temperature sensing layer.

According to an example, the sensing layer may include a hydrogen sensing layer.

According to an example, the sensing layer may include a radiation sensing layer.

A fluid monitoring apparatus according to an example of the inventive concept includes: a chamber having a window; a light source configured to provide pump light into the chamber; a beam splitter provided between the light source and the chamber; a resonator disposed in the chamber and configured to receive the pump light and provide laser light to the beam splitter; and a detector configured to detect the laser light. Here, the resonator may include: a disk plate having meta holes; a temperature sensing ring provided in each of the meta holes; a hydrogen sensing ring provided in the temperature sensing ring; and a radiation sensing ring provided in the meta holes and at an outer periphery of the temperature sensing ring.

According to an example, the chamber may include: a bottom plate; a sidewall provided on the bottom plate and disposed around the resonator; and a window plate disposed on the sidewall and transmitting the pump light and the laser light.

According to an example, wherein the sidewall may have an inlet through which the fluid is provided to the resonator and an outlet opposing the inlet and discharging the fluid.

According to an example, the pump light may have a wavelength of about 975 nm.

According to an example, the meta holes may have a maximum filling fraction of 8% with regard to the disk plate.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Figure 1:
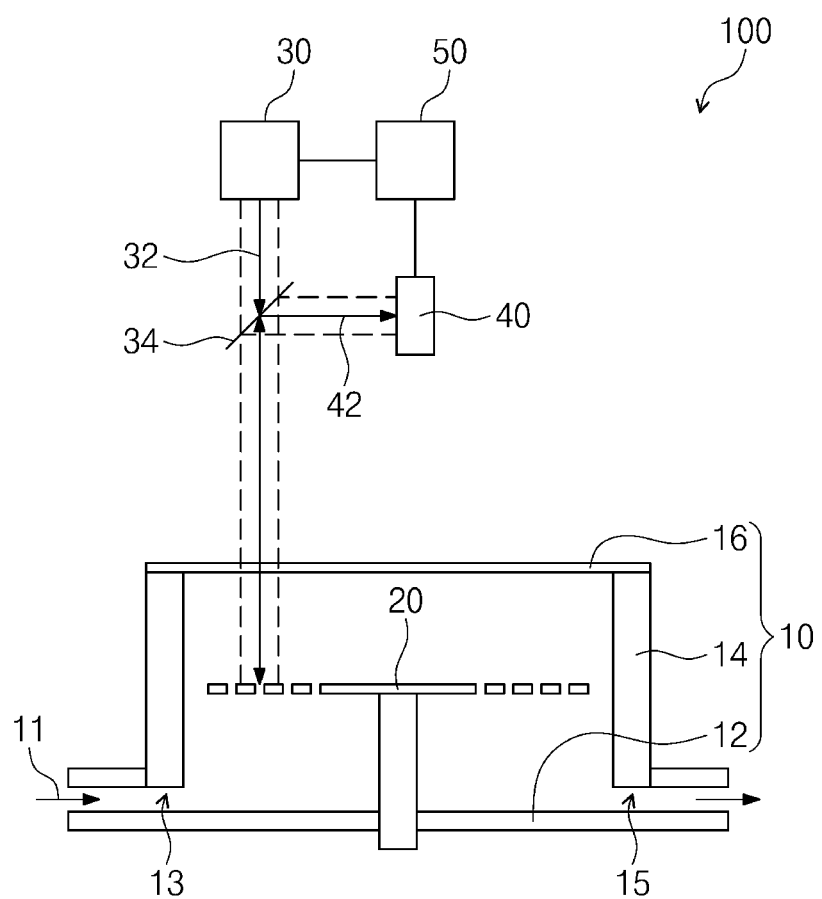
FIG. 1 is a cross-sectional view of an example of a fluid monitoring apparatus according to the inventive concept.

Embodiments of the inventive concept will now be described in detail with reference to the accompanying drawings. The advantages and features of embodiments of the inventive concept, and methods for achieving the advantages and features will be apparent from the embodiments described in detail below with reference to the accompanying drawings. However, the inventive concept may be embodied in different forms and should not be construed as limited to the embodiments set forth herein. Rather, these embodiments are provided so that this disclosure will be thorough and complete, and will fully convey the scope of the inventive concept to those skilled in the art, and the inventive concept is only defined by the scope of the claims. Like reference numerals refer to like elements throughout.

The terminology used herein is not for delimiting the embodiments of the inventive concept but for describing the embodiments. The terms of a singular form may include plural forms unless otherwise specified. It will be further understood that the terms "includes", "including", "comprises", and/or "comprising", when used 'in this description, specify the presence of stated elements, operations, and/or components, but do not preclude the presence or addition of one or more other elements, operations, and/or components. Furthermore, reference numerals, which are presented in the order of description, are provided according to the embodiments and are thus not necessarily limited to the order.

The embodiments of the inventive concept will be described with reference to example cross-sectional views and/or plan views. In the drawings, the dimensions of layers and regions are exaggerated for clarity of illustration. Therefore, the forms of the example drawings may be changed due to a manufacturing technology and/or error tolerance. Therefore, the embodiments of the inventive concept may involve changes of shapes depending on a manufacturing process, without being limited to the illustrated specific forms.

FIG. 1 illustrates an example of a fluid monitoring apparatus 100 according to the inventive concept.

Referring to FIG. 1, the fluid monitoring apparatus 100 of the inventive concept may be a meta-hole micro disk laser sensor. According to an example, the fluid monitoring apparatus 100 of the inventive concept may include a chamber 10, a resonator 20, a pump light source 30, a detector 40, and a control unit 50.

The chamber 10 may store a fluid 11. For example, the fluid 11 may include a liquid such as water or an organic solvent. Alternatively, the fluid 11 may include a gas such as air, but an embodiment of the inventive concept is not limited thereto. The chamber 10 may have an inlet 13 and an outlet 15. The inlet 13 may be provided to one side of the chamber 10. The outlet 15 may be provided on another side of the chamber 10 opposing the inlet 13. The fluid 11 may be provided into the chamber 10 through the inlet 13 and discharged to the outside of the chamber 10 through the outlet 15. According to an example, the chamber 10 may include a bottom plate 12, sidewalls 14, and a window plate 16.

The bottom plate 12 may be provided under the sidewalls 14 and the window plate 16. The bottom plate 12 may include glass, ceramic, plastic, or metal, but an embodiment of the inventive concept is not limited thereto. Although not illustrated, the bottom plate 12 may have a reflective layer that reflects laser light 42. The reflective layer may be provided on an upper surface of the bottom plate 12.

The sidewalls 14 may be provided between the bottom plate 12 and the window plate 16. The sidewalls 14 may surround an outer periphery of the resonator 20. The sidewalls 14 may have the inlet 13 and the outlet 15. For example, the sidewalls 14 may include glass, ceramic, plastic, or metal.

The window plate 16 may be provided on the sidewalls 14. The window plate 16 may transmit and/or refract pump light 32 and the laser light 42. The window plate 16 may include glass or plastic.

The resonator 20 may be provided in the chamber 10. In the case where the fluid 11 is a liquid, the resonator 20 may be immersed in the fluid 11. The resonator 20 may be a whispering-gallery mode resonator. The resonator 20 may receive the pump light 32 and generate the laser light 42. The laser light 42 may include a whispering-gallery mode, but an embodiment of the inventive concept is not limited thereto. The laser light 42 may travel in an opposite direction to the pump light 32.

The pump light source 30 may be disposed on the chamber 10. The pump light source 30 may provide the pump light 32 to the resonator 20 in the chamber 10. For example, the pump light source 30 may include a laser diode. The pump light 32 may have a wavelength of about 975 nm.

A beam splitter 34 may be provided between the pump light source 30 and the chamber 10. The beam splitter 34 may be provided between the chamber 10 and the detector 40. The beam splitter 34 may transmit the pump light 32 to the resonator 20 and may reflect the laser light 42 to the detector 40. For example, the beam splitter 34 may include a dichroic mirror, but an embodiment of the inventive concept is not limited thereto.

The detector 40 may be provided adjacent to the beam splitter 34. The detector 40 may receive the laser light 42. The detector 40 may detect the laser light 42. For example, the detector 40 may include a photodiode.

The control unit 50 may be connected to the pump light source 30 and the detector 40. The control unit 50 may control the pump light source 30. The control unit 50 may monitor and/or detect a change in a wavelength of the laser light 42 using a detection signal of the laser light 42. The control unit 50 may identify impurities in the fluid 11 by monitoring a refractive index change of the fluid 11.

Figure 2:
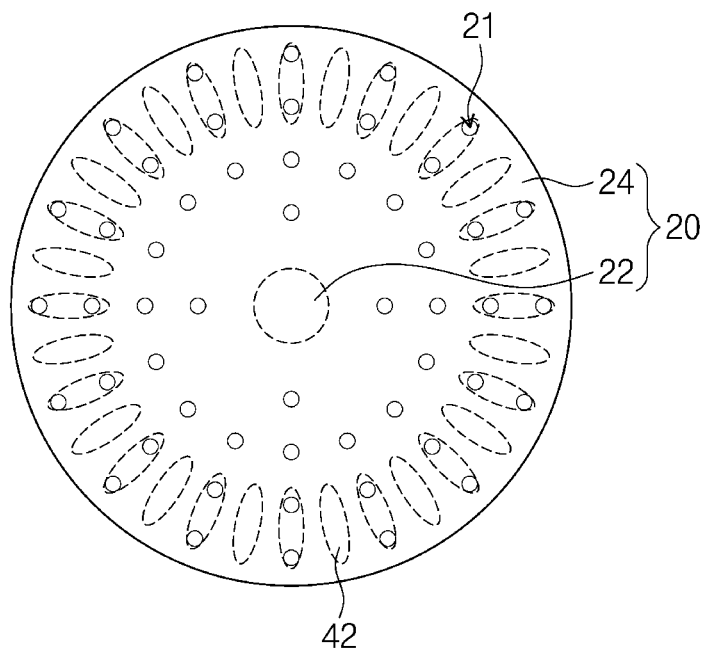
FIGS. 2 and 3 are a plan view and cross-sectional view illustrating an example of the resonator of FIG. 1.
Figure 3:
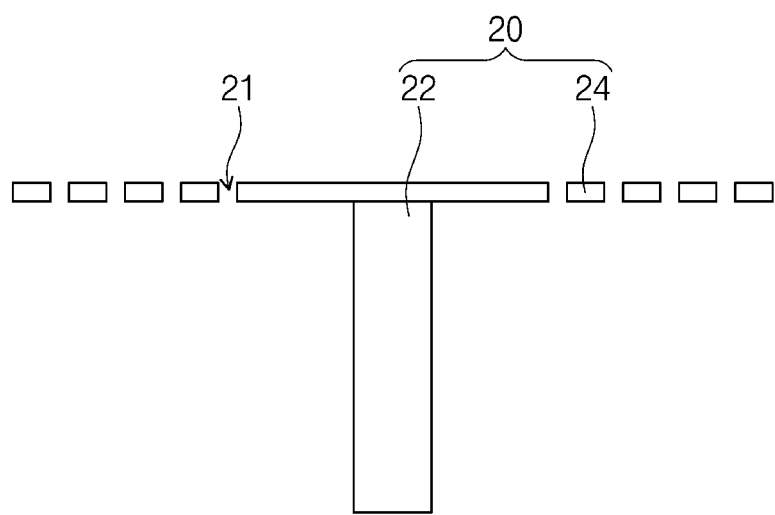

FIGS. 2 and 3 illustrate an example of the resonator 20 of FIG. 1.

Referring to FIGS. 2 and 3, the resonator 20 may include a support 22 and a disk plate 24.

The support 22 may be provided under a center of the disk plate 24. The support 22 may support the disk plate 24. The support 22 may rotate the disk plate 24. For example, the support 22 may include a metal shaft or a ceramic shaft, but an embodiment of the inventive concept is not limited thereto.

The disk plate 24 may be provided on the support 22. The disk plate 24 may have a circular shape in a plan view. For example, the disk plate 24 may include group III-V semiconductor materials such as GaN, GaAs, InP, or InGaAsP. According to an example, the disk plate 24 may have meta holes 21. The meta holes 21 may penetrate the disk plate 24. The meta holes 21 may have a diameter of about 1 nm to about 100 μm. The meta holes 21 each may have a circular shape in a plan view.

Referring to FIGS. 1 to 3, the pump light 32 may be provided in a direction perpendicular to the disk plate 24 or in the same direction as the meta holes 21. The meta holes 21 may pass the fluid 11 therethrough. The disk plate 24 may generate the laser light 42 by absorbing the pump light 32. The laser light 42 may be provided to the beam splitter 34 and the detector 40. The laser light 42 may be generated along an edge of the disk plate 24. Strength of the laser light 42 may have a plurality of elliptical shapes in a plan view.

Figure 4:
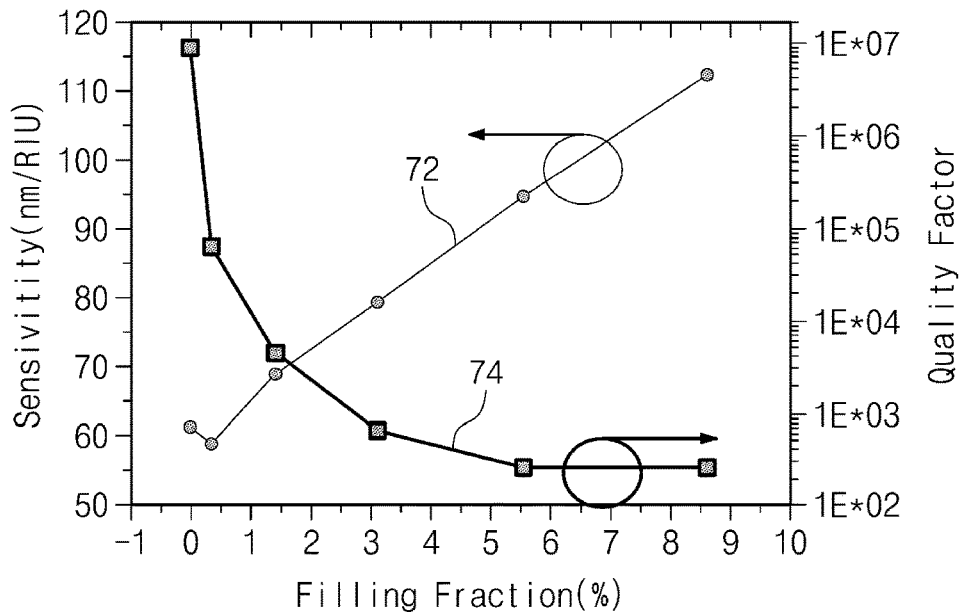
FIG. 4 is a graph showing a refractive index sensitivity and quality factor according to a filling fraction of the meta holes of FIG. 3.

FIG. 4 shows a refractive index sensitivity 72 and a quality factor 74 according to a filling fraction of the meta holes 21 of FIG. 3.

Referring to FIG. 4, the meta holes 21 may increase the refractive index sensitivity 72 and reduce the quality factor 74 of the fluid 11 with regard to the laser light 42. For example, the filling fraction of the meta holes 21 with regard to the disk plate 24 may be about 1.5% to about 5.5%. The filling fraction of the meta holes 21 with regard to the disk plate 24 may be at most about 8%.

The refractive index sensitivity 72 may be proportional to the filling fraction of the meta holes 21 with regard to the disk plate 24. As an area size of the meta holes 21 in the disk plate 24 increases, the refractive index sensitivity 72 of the fluid 11 may increase. As the area size of the meta holes 21 decreases, the refractive index sensitivity 72 may decrease.

The quality factor 74 may be inversely proportional to the filling fraction of the meta holes 21. As the filling fraction of the meta holes 21 increases, the quality factor 74 may decrease. As the filling fraction of the meta holes 21 decreases, the quality factor 74 may increase.

Figure 5:
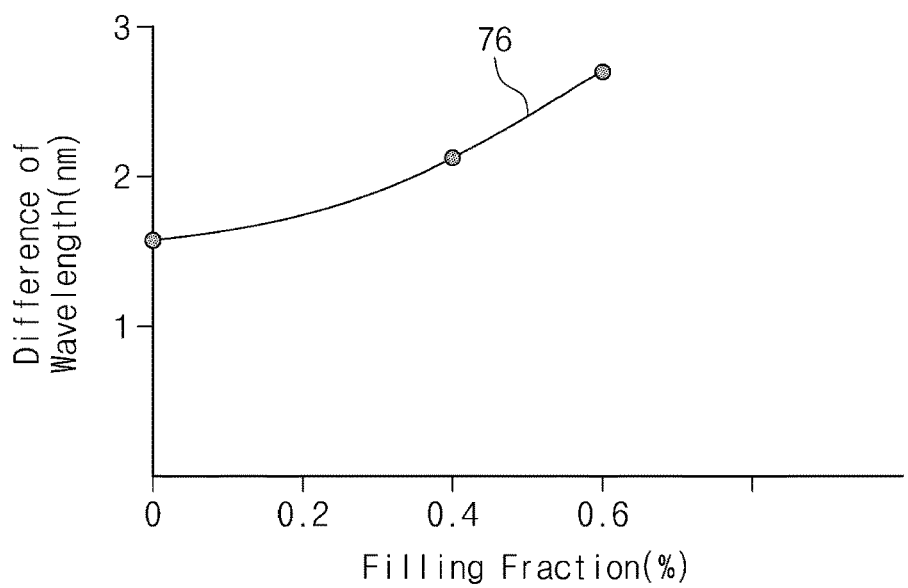
FIG. 5 is a graph showing a wavelength difference of pump light according to a filling fraction of the meta holes of FIG. 3.

FIG. 5 shows a wavelength difference 76 of the pump light 32 according to the filling fraction of the meta holes 21 of FIG. 3.

Referring to FIG. 5, the meta holes 21 may increase the wavelength difference 76 of the laser light 42. As the filling fraction of the meta holes 21 increases, the wavelength difference 76 of the laser light 42 may increase.

Figure 6:
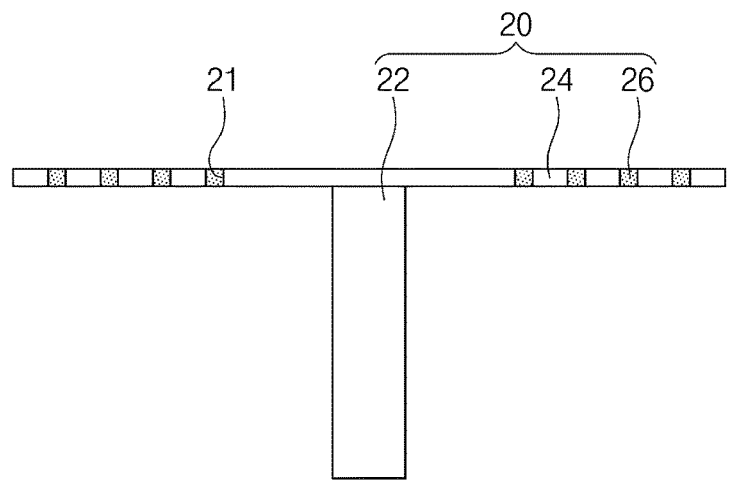
FIG. 6 is a cross-sectional view illustrating an example of the resonator of FIG. 1.

FIG. 6 illustrates an example of the resonator 20 of FIG. 1.

Referring to FIG. 6, the resonator 20 may further include a temperature sensing layer 26. The temperature sensing layer 26 may be provided in the meta holes 21 of the disk plate 24. The temperature sensing layer 26 may have an upper surface that is coplanar with an upper surface of the disk plate 24. Furthermore, the temperature sensing layer 26 may have a lower surface that is coplanar with a lower surface of the disk plate 24. The temperature sensing layer 26 may have a refractive index that changes according to a temperature of the fluid 11 (FIG. 1). Furthermore, the temperature sensing layer 26 may change a resonance wavelength 82 of the laser light 42 in proportion to the temperature of the fluid 11. For example, the temperature sensing layer 26 may include a phase changing material of $Ge_2Sb_2Te_5$.

Figure 7:
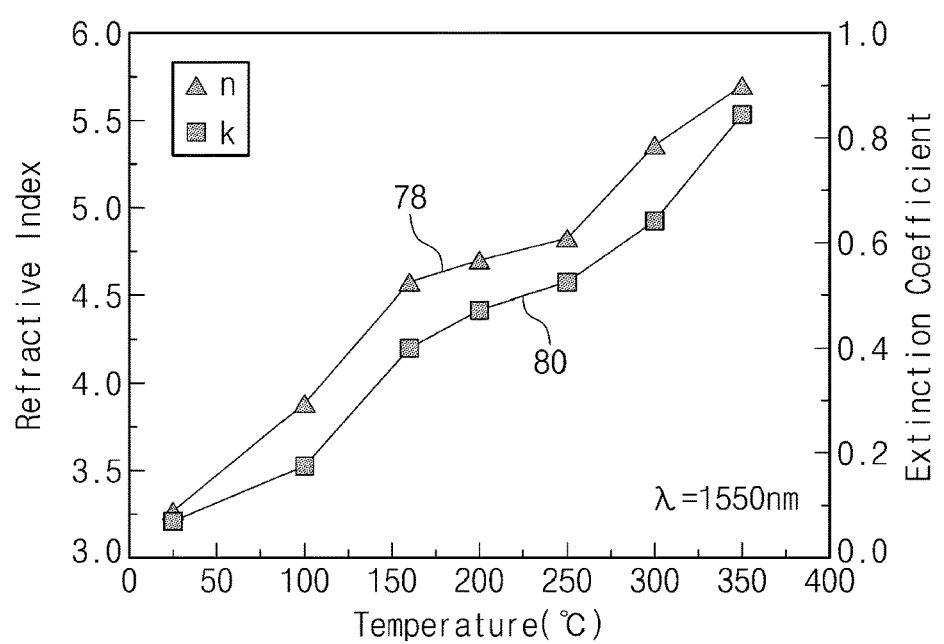
FIG. 7 is a graph showing a refractive index and extinction coefficient of the temperature sensing layer of FIG. 6 according to the temperature thereof.

FIG. 7 shows a refractive index 78 and an extinction coefficient 80 of the temperature sensing layer 26 of FIG. 6 according to the temperature thereof.

Referring to FIG. 7, the refractive index 78 and extinction coefficient 80 of the temperature sensing layer 26 may increase in proportion to the temperature of the temperature sensing layer 26. When the temperature increases from about 25° C. to about 350° C., the refractive index 78 of the temperature sensing layer 26 may increase from about 3.25 to about 5.7, and the extinction coefficient 80 may increase from about 0.1 to about 0.85.

Figure 8:
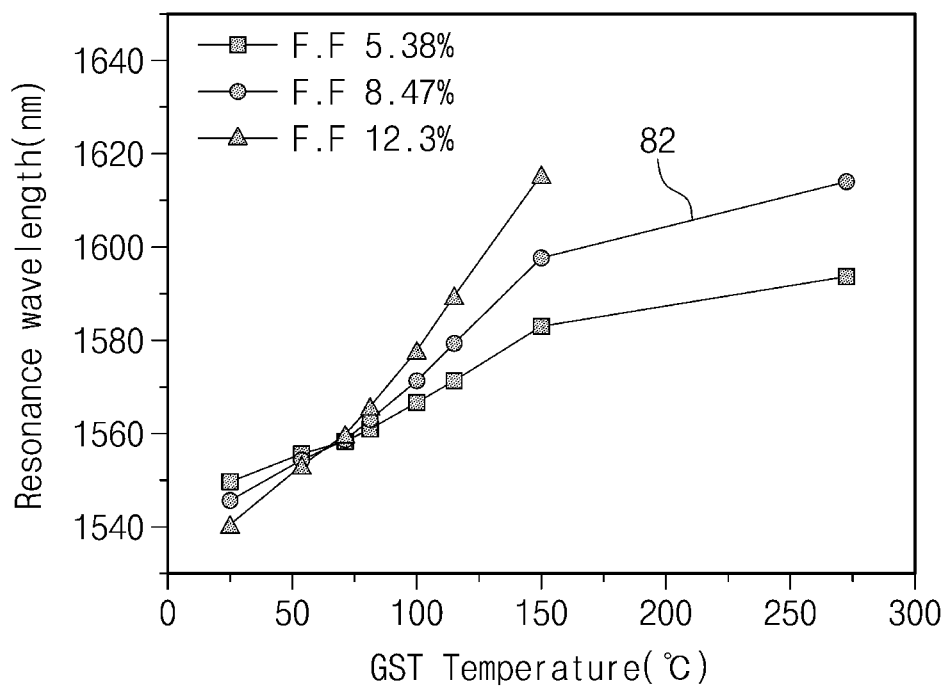
FIG. 8 is a graph showing a resonance wavelength of laser light according to the temperature of the temperature sensing layer of FIG. 6.

FIG. 8 shows the resonance wavelength 82 of the laser light 42 according to the temperature of the temperature sensing layer 26 of FIG. 6.

Referring to FIG. 8, the resonance wavelength 82 of the laser light 42 may be proportional to the temperature of the temperature sensing layer 26. When the temperature increases from about 25° C. to about 275° C., the resonance wavelength 82 of the laser light 42 may increase from about 1540 nm to about 1615 nm.

Referring to FIGS. 1, 6, and 8, the control unit 50 may determine the temperature of the fluid 11 by detecting the resonance wavelength 82 of the laser light 42.

Figure 9:
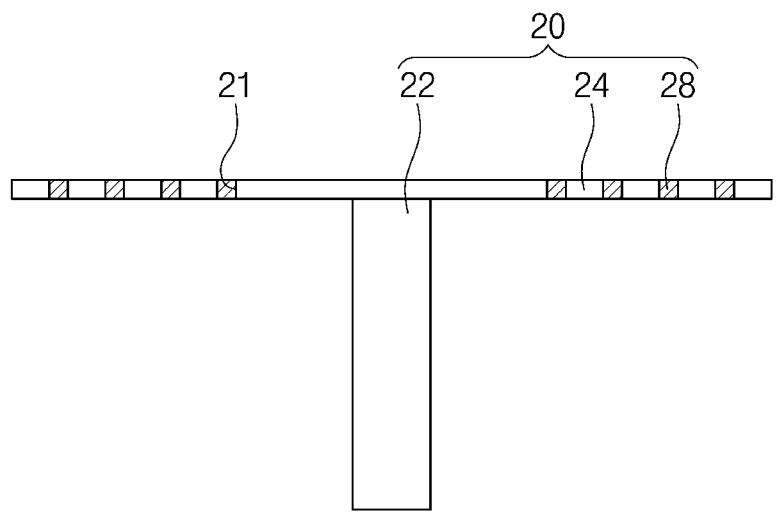
FIG. 9 is a cross-sectional view illustrating an example of the resonator of FIG. 1.

FIG. 9 illustrates an example of the resonator 20 of FIG. 1.

Referring to FIG. 9, the resonator 20 may further include a hydrogen sensing layer 28. The hydrogen sensing layer 28 may be provided in the meta holes 21. The hydrogen sensing layer 28 may have an upper surface that is coplanar with the upper surface of the disk plate 24. The hydrogen sensing layer 28 may have a lower surface that is coplanar with the lower surface of the disk plate 24. The hydrogen sensing layer 28 may change the resonance wavelength 82 of the laser light 42 according to hydrogen content in the fluid 11 (FIG. 1). For example, the hydrogen sensing layer 28 may include palladium (Pd).

Referring to FIGS. 1 and 9, the control unit 50 may determine hydrogen in the fluid 11 or hydrogen content in the fluid 11 by detecting the resonance wavelength 82 of the laser light 42. Furthermore, the control unit 50 may display the presence of hydrogen or the hydrogen content in the fluid 11 on a display device.

Figure 10:
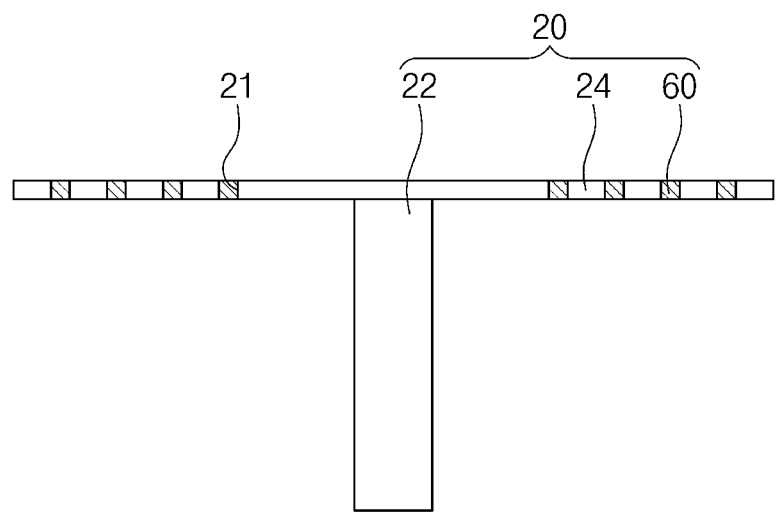
FIG. 10 is a cross-sectional view illustrating an example of the resonator of FIG. 1.

FIG. 10 illustrates an example of the resonator 20 of FIG. 1.

Referring to FIG. 10, the resonator 20 may further include a radiation sensing layer 60. The radiation sensing layer 60 may be provided in the meta holes 21. The radiation sensing layer 60 may have an upper surface that is coplanar with the upper surface of the disk plate 24. Furthermore, the radiation sensing layer 60 may have a lower surface that is coplanar with the lower surface of the disk plate 24. The radiation sensing layer 60 may change the resonance wavelength 82 of the laser light 42 in proportion to radiation content in the fluid 11. For example, the radiation sensing layer 60 may include silicon carbide (SiC).

Referring to FIGS. 1 and 10, the control unit 50 may determine a radioactive material in the fluid 11 or radioactive material content in the fluid 11 by detecting the resonance wavelength 82 of the laser light 42.

Figure 11:
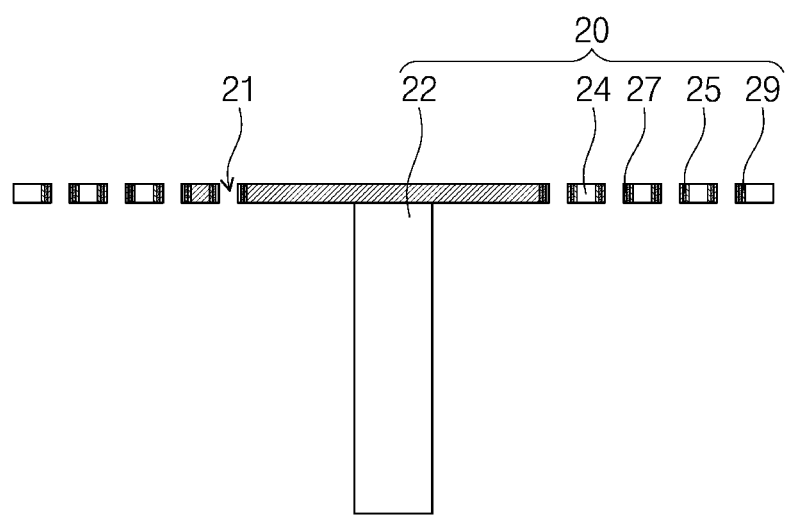
FIGS. 11 and 12 are a cross-sectional view and plan view illustrating an example of the resonator of FIG. 1.
Figure 12:
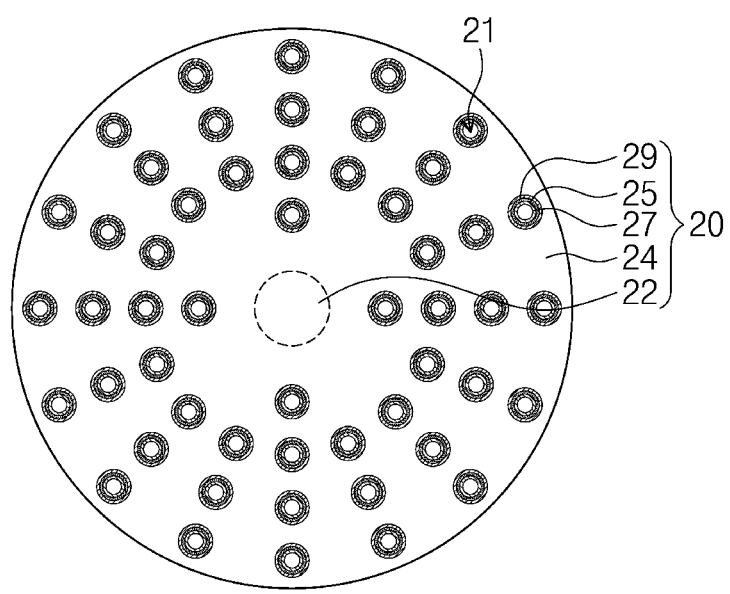

FIGS. 11 and 12 illustrate an example of the resonator 20 of FIG. 1.

Referring to FIGS. 11 and 12, the resonator 20 may further include temperature sensing rings 25, hydrogen sensing rings 27, and radiation sensing rings 29.

The temperature sensing rings 25 may be provided in the meta holes 21 respectively. The temperature sensing rings 25 may be provided in the radiation sensing rings 29 respectively. The temperature sensing rings 25 may include a phase changing material of $Ge_2Sb_2Te_5$. The temperature sensing rings 25 may change the resonance wavelength 82 of the laser light 42 according to the temperature of the fluid 11 and the disk plate 24.

The hydrogen sensing rings 27 may be provided in the temperature sensing rings 25. The hydrogen sensing rings 27 may be smaller than the temperature sensing rings 25 in a plan view. The hydrogen sensing rings 27 may change the resonance wavelength 82 of the laser light 42 according to the presence of hydrogen or the hydrogen content in the fluid 11. The hydrogen sensing rings 27 may include palladium (Pd). The hydrogen sensing rings 27 may have a volume that increases according to the temperature of the fluid 11 and the disk plate 24. When the temperature of the fluid 11 and the disk plate 24 increases, the hydrogen sensing rings 27 expand into the meta holes 21, thereby minimizing deformation of the resonator 20.

The radiation sensing rings 29 may be provided around the temperature sensing rings 25. The radiation sensing rings 29 may be larger than the temperature sensing rings 25 in a plan view. The radiation sensing rings 29 may be provided to an inner sidewall of the disk plate 24 of the meta holes 21. The radiation sensing rings 29 may change the resonance wavelength 82 of the laser light 42 according to the presence of radioactive material or the radioactive material content in the fluid 11. For example, the radiation sensing rings 29 may include silicon carbide (SiC).

The control unit 50 may detect the temperature of the fluid 11 and hydrogen and radioactive material in the fluid 11 by detecting the resonance wavelength of the laser light 42.

As described above, the fluid monitoring apparatus according to an embodiment of the inventive concept may detect a physical quantity in a fluid using a disk plate having meta holes that increase refractive index sensitivity to laser light.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A fluid monitoring apparatus, comprising:
a chamber configured to store a fluid;
a resonator disposed in the chamber;
a light source disposed on the chamber and configured to provide pump light to the resonator;
a detector configured to detect laser light generated in the resonator; and
a control unit connected to the detector and the light source, and configured to identify impurities in the fluid by detecting a resonance wavelength of the laser light based on a detection signal of the laser light,
wherein the resonator comprises:
a support; and
a disk plate provided on the support and having meta holes through which the fluid passes,
a temperature sensing ring provided in each of the meta holes;
a hydrogen sensing ring provided in the temperature sensing ring; and
a radiation sensing ring provided in each of the meta holes and at an outer periphery of the temperature sensing ring.

2. The fluid monitoring apparatus of claim 1,
wherein the temperature sensing ring includes a phase changing material.

3. The fluid monitoring apparatus of claim 2,
wherein the hydrogen sensing ring includes palladium.

4. The fluid monitoring apparatus of claim 3,
wherein the radiation sensing ring includes silicon carbide.

5. A fluid monitoring apparatus comprising:
a chamber configured to store a fluid;
a light source configured to provide pump light into the chamber;
a resonator disposed in the chamber and configured to receive the pump light and generate laser light;
a beam splitter provided between the light source and the chamber, and configured to transmit the pump light and reflect the laser light; and
a detector provided adjacent to the beam splitter and configured to detect the laser light,
wherein the resonator comprises:
a disk plate having meta holes; and
a temperature sensing ring provided in each of the meta holes;
a hydrogen sensing ring provided in the temperature sensing ring; and
a radiation sensing ring provided in each of the meta holes and at an outer periphery of the temperature sensing ring.

6. The fluid monitoring apparatus of claim 5, wherein the disk plate includes a group III-V semiconductor material.

7. A fluid monitoring apparatus comprising:
a chamber having a window;
a light source configured to provide pump light into the chamber;
a beam splitter provided between the light source and the chamber;
a resonator disposed in the chamber and configured to receive the pump light and provide laser light to the beam splitter; and
a detector configured to detect the laser light,
wherein the resonator comprises:
a disk plate having meta holes;
a temperature sensing ring provided in each of the meta holes;
a hydrogen sensing ring provided in the temperature sensing ring; and
a radiation sensing ring provided in each of the meta holes and at an outer periphery of the temperature sensing ring.

8. The fluid monitoring apparatus of claim 7, wherein the chamber comprises:
a bottom plate;
a sidewall provided on the bottom plate and disposed around the resonator; and
a window plate disposed on the sidewall and transmitting the pump light and the laser light.

9. The fluid monitoring apparatus of claim 8, wherein the sidewall has an inlet through which the fluid is provided to the resonator and an outlet opposing the inlet and discharging the fluid.

10. The fluid monitoring apparatus of claim 7, wherein the pump light has a wavelength of about 975 nm.

11. The fluid monitoring apparatus of claim 7, wherein the meta holes have a maximum filling fraction of 8% with regard to the disk plate.

* * * * *